US008945385B2

(12) United States Patent
Wesselmann et al.

(10) Patent No.: US 8,945,385 B2
(45) Date of Patent: Feb. 3, 2015

(54) DRIVE DEVICE FOR A MEMBRANE FILTRATION ARRANGEMENT

(75) Inventors: Reinhold Wesselmann, Cloppenburg (DE); Amin Schwarz, Vechta (DE)

(73) Assignee: Big Dutchman International GmbH, Vechta (DE)

( * ) Notice: Subject to any disclaimer, the term of this patent is extended or adjusted under 35 U.S.C. 154(b) by 0 days.

(21) Appl. No.: 13/520,942

(22) PCT Filed: Jan. 7, 2011

(86) PCT No.: PCT/EP2011/050184
§ 371 (c)(1),
(2), (4) Date: Dec. 17, 2012

(87) PCT Pub. No.: WO2011/083148
PCT Pub. Date: Jul. 14, 2011

(65) Prior Publication Data
US 2013/0193076 A1    Aug. 1, 2013

(30) Foreign Application Priority Data
Jan. 8, 2010  (DE) ............... 20 2010 000 751 U

(51) Int. Cl.
*C02F 1/44* (2006.01)
*B01D 63/08* (2006.01)
(Continued)

(52) U.S. Cl.
CPC .............. *C02F 1/44* (2013.01); *B01D 63/082* (2013.01); *B01D 63/16* (2013.01);
(Continued)

(58) Field of Classification Search
USPC .............. 210/297, 324, 321.67, 321.69, 350, 210/351, 352, 357, 359, 364, 367, 384, 385, 210/388, 785, 224–231
See application file for complete search history.

(56) References Cited

U.S. PATENT DOCUMENTS 4,289,630 A    9/1981  Schmidt, Jr. et al.
4,952,317 A    8/1990  Culkin
(Continued)

FOREIGN PATENT DOCUMENTS

| JP | 2006-218455 | * | 8/2006 |
| KR | 20030016721 | | 3/2003 |

(Continued)

OTHER PUBLICATIONS

International Search Report, PCT/EP2011/050184, dated Apr. 7, 2011.
(Continued)

*Primary Examiner* — David C Mellon
*Assistant Examiner* — Pranav Patel
(74) *Attorney, Agent, or Firm* — Price Heneveld LLP

(57) ABSTRACT

The invention relates to a membrane filtration device comprising a plurality of planar membrane filter elements which are combined to form a membrane package and are disposed within the membrane package parallel to and spaced apart from one another. A wall encloses the membrane package on all sides, and within which at least one inlet chamber which is connected to at least one inlet, and at least one outlet chamber which is connected to at least one outlet. An oscillation unit is connected to the membrane package and the wall to induce oscillation in a direction parallel to the membrane filter elements. The oscillation unit is connected to a frame which encloses the membrane package and which is connected to the wall of the membrane package by means of least one spring, whose main direction of spring action extends parallel to the plane of the membrane filter.

17 Claims, 4 Drawing Sheets

(51) Int. Cl.
*B01D 63/16* (2006.01)
*C02F 101/16* (2006.01)
*C02F 103/06* (2006.01)
*C02F 103/20* (2006.01)

(52) U.S. Cl.
CPC ...... *B01D 2315/04* (2013.01); *C02F 2101/163* (2013.01); *C02F 2103/06* (2013.01); *C02F 2103/20* (2013.01); *C02F 2303/16* (2013.01)
USPC .................. 210/321.67; 210/321.84; 210/785

(56) References Cited

U.S. PATENT DOCUMENTS

| | | | | |
|---|---|---|---|---|
| 5,014,564 | A | * | 5/1991 | Culkin ................................ 74/61 |
| 5,192,456 | A | * | 3/1993 | Ishida et al. .................. 210/791 |
| 6,322,698 | B1 | * | 11/2001 | Rios et al. ................ 210/321.75 |
| 7,297,278 | B2 | | 11/2007 | Steele et al. |
| 2003/0047516 | A1 | * | 3/2003 | Alviti ............................ 210/738 |
| 2005/0023219 | A1 | * | 2/2005 | Kirker et al. .................. 210/636 |

FOREIGN PATENT DOCUMENTS

| | | |
|---|---|---|
| KR | 1020030016721 | 3/2003 |
| WO | 2009017758 | 2/2009 |

OTHER PUBLICATIONS

Office Action, Eurasian Patent Appln No. 201290621/31; Applicant Big Dutchman International GmbH, DE. Translated; undated.
New Logic, Research, Inc., http://vsep.com/pdf/VSEP_Brochure.pdf (2012).
State Intellectual Property Office of the People's Republic of China, Appln. No. 201180009493.X, for Drive Device for a Membrane Filtration Arrangement (Dec. 4, 2013) (translated).
The Korean Intellectual Property Office, Notice of Reasons for Rejection for Appl. Big Dutchman International GmbH, Korean Patent Appln No. 10-2012-7020074, dated Aug. 29, 2014.

* cited by examiner

DRIVE DEVICE FOR A MEMBRANE FILTRATION ARRANGEMENT

BACKGROUND OF THE INVENTION

The present invention relates to a membrane filtration device comprising a plurality of planar membrane filter elements which are combined to form a membrane package and which are disposed within the membrane package parallel to and spaced apart from one another, a wall which encloses the membrane package on all sides, and within which at least one inlet chamber which is connected to at least one inlet opening for feeding a fluid to be filtered formed upstream from the membrane filter elements, and at least one outlet chamber which is connected to at least one outlet opening for discharging a filtered fluid portion produced by filtration formed downstream from the membrane filter elements, and an oscillation unit which is connected to the membrane package and the wall to create oscillation in a direction parallel to the membrane filter elements. Another aspect of the present invention relates to a separation method for biologically contaminated wastewater in agriculture.

A core problem in modern agriculture concerns the treatment of contaminated wastewater. As a result of tougher environmental standards, methods which were previously widespread, such as spreading such contaminated wastewater on fields over large areas, can now be considered to only a very limited extent or not at all. Methods are therefore needed for treating such contaminated wastewater efficiently in such a way that it satisfies higher environmental standards and ideally may be disposed of as normal wastewater.

One possible way of achieving this is to treat the wastewater in a sewage treatment plant, for example. However, this involves complex equipment and is therefore both costly and maintenance-intensive. Treatment in a sewage treatment plant is not an economical path, therefore, for treating biological contaminated wastewater produced by agriculture.

A filter technology for treating colloidal suspensions and which can be used on a laboratory scale is basically known for a different technical field from U.S. Pat. No. 4,952,317. The latter relates to a membrane filtration device in which a membrane package composed of a plurality of membrane composites arranged in parallel is made to oscillate, the direction of oscillation being parallel to the surface of the membranes. As a result, a shear force is generated between the membrane surface and the colloidal suspension to be filtered, which prevents clogging of the membrane by solid particles and thus allows filtration to be maintained for a certain duration of operation.

The inventor of the present device and of the present method has realized that this membrane filtration principle is basically suitable as well for filtering biologically contaminated wastewater in agriculture. However, when using the device described in U.S. Pat. No. 4,952,317, problems arose which prohibited any efficient operation for this kind of wastewater. For the device shown therein, various options are described for making the membrane package oscillate. These include reciprocal translational oscillations or circular oscillations which are exerted directly on the membrane package by a drive means. The drive means are either rotary actuators with rigid kinematics, or electromechanical torsional resonators. These are rigidly connected to the membrane package in such a way that any vibration produced inside these vibrating units is meant to be transferred directly to the membrane package. It has been found that efficient membrane filtration of biologically contaminated wastewater in agriculture cannot be achieved in this way, either because the energy input for membrane filtration is too high or because the operating time of the membrane filtration device between the necessary replacement of all the membrane filters is too short.

Another membrane filtration device, comprising a membrane package to which a vibratory motion is imparted by means of a drive mechanism in order to enhance filtration, is known from U.S. Pat. No. 6,322,698 B1. Although a system which is suitable for filtering biologically contaminated wastewater in agriculture, using the approach on which the invention is based, is also described in this prior publication, the publication does not provide any indications as to how this system could be developed in a way that allows membrane filtration of such wastewater to be operated in an economically efficient manner.

A membrane filtration device for separating metals and water by adding precipitators is known from U.S. Pat. No. 7,297,278 B2. However, a disadvantage of this device is the need to add precipitators, which makes it more difficult to conduct the process continuously and which also reduces the economic efficiency of the process due to the required addition of consumables in the form of the precipitators.

The object of the present invention is therefore to provide a device for cleaning biologically contaminated wastewater in agriculture and which can be operated in an economically efficient manner.

SUMMARY OF THE INVENTION

According to the present invention, this object is achieved with a device in which the oscillation unit is connected to a frame which encloses the membrane package and which is connected to the wall of the membrane package by means of least one spring whose main direction of spring action extends parallel to the plane of the membrane filter.

The at least one spring may be a coil spring which extends parallel to the plane of the membrane filter elements. Leaf springs, helical springs, disc springs or the like may be used alternatively.

With the membrane filtration device according to the present invention, a development of prior art membrane filtration devices is proposed that permits efficient oscillation of the membrane package even under differing loads, due to a specific configuration and coupling of the oscillation unit to the membrane package. In comparison to prior art devices, the amount of energy that needs to be inputted to produce the oscillation is substantially less, with a simultaneously higher oscillation amplitude. One technically relevant feature in this regard is the use of one or a plurality of springs which couple the membrane package to an external frame which encloses the membrane package. The oscillation unit is connected, for its part, to the frame. This kind of coupling avoids having a rigid coupling between the oscillation unit and the membrane package. Instead, the membrane package itself, in combination with the at least one spring, is designed as an oscillation system which has a resonance frequency. According to the present invention, this resonance frequency is such that shear forces acting on the membrane surfaces are produced with it in a particularly efficacious manner, as a result of which membrane filtration can likewise occur in a particularly efficacious manner.

According to the present invention, a plurality of springs are provided whose direction of force application extends parallel to the plane of the membrane filter elements, in particular in that the springs extend parallel to the plane of the membrane filter elements, and which are connected at a first end to the wall of the membrane package and at a second end to the frame, wherein the springs are subdivided into at least one first set and one second set of springs and that all the springs within each set of springs extend parallel to each other and that the direction of the springs in one set extend at an angle, preferably perpendicularly to the direction of the springs of another set. The present inventive principle is further improved such that, by providing a plurality of springs which are subdivided into at least two sets, the function of guiding the membrane package in the desired oscillation direction by the spring is improved or indeed is provided in full. It should be understood in this regard that the springs in each set may be arranged adjacent each other in a plane, or in several planes. By arranging and subdividing the springs in sets, it is possible to produce a mechanically determined system which oscillates in a defined direction and with a defined amplitude.

It should also be understood as a basic principle that springs of different constructions may be used in order to realize the advantages and effects of the present invention. For example, coil springs may preferably be used, for example, with which the direction of force application is the same as the direction of extension of the spring. Alternatively, however, it is possible to use other types of spring, for example leaf springs disc springs or the like, which likewise apply force in a straight line or in an approximately straight line. Finally, it is also possible to use types of spring which have exert a torsional force about an axis, such as helical springs or torsion bar springs, which consequently require a respective mechanical linkage in order to be used in the device according to the present invention.

A parallel arrangement of the springs is specifically understood to be a parallel arrangement of the lines of action of the springs on the membrane package, taking the respective deflection mechanisms into consideration where relevant. The springs may likewise be arranged spatially parallel, although with certain types of springs the spatial arrangement may also deviate from such a parallel arrangement.

By arranging the springs of the two sets at an angle of 90° to one another, it is possible to obtain defined oscillatory motion of constant amplitude. If, in contrast, the two sets are arranged at a different angle to each other, it is possible to form a multiple undetermined mechanical system which performs oscillations of different amplitudes in successive series of oscillations. Depending on what type of wastewater is to be treated and, depending, in particular, on the density of the wastewater and its level of contamination with solid particles, the one or other arrangement of the sets of springs in relation to each other may be preferred. More specifically, it is preferred that the coil springs be subdivided into a total of four sets, of which two sets are parallel to and spaced apart from each other, and each set is at an angle of 90° to another set such that the sets form a rectangle in cross section.

It is still further preferred that the spring constants and the length and the quantity of the springs and the oscillation unit are adapted in such a way to the mass of the membrane package that the oscillation unit is able to make the oscillation system consisting of the at least one spring and the membrane package oscillate at one of its resonance frequencies. When configured in this way, the membrane package can be made to oscillate at a resonance frequency, which results in a particularly small amount of energy input being required to achieve a particularly high oscillation amplitude.

It is particularly preferred that the bias, the spring constants, the effective quantity and/or the effective length of the springs between the frame and the membrane package can be adjusted in order to set the resonance frequency of the oscillation system formed by the at least one spring and the membrane package. With this development of the present invention, it is possible to set a resonance frequency that is particularly effective for membrane filtration and to do so during ongoing operation in such a way that the oscillation characteristics can be adapted accordingly, depending on different loads, such are different volumes or densities of the medium to be filtered. This can be done most simply by coupling springs in or out. In another variant, the effective length of the springs can be changed by partially blocking them. It should be understood that the various options for setting a desired resonance frequency of the vibration system can be achieved with single measures of the kind described above, or with a combination of such measures.

It is further preferred that the membrane package be suspended inside the frame by means of traction members, preferably wire cables, which transfer the weight force of the membrane package to the frame. This configuration provides a way of bearing the weight of the membrane package that is particularly beneficial for the desired resonance effect, and which also allows the membrane package, for maintenance purposes, to be moved in a simple manner out of the frame and dismantled. The traction members may extend from the top edge of the membrane package to frame struts thereabove. On the one hand, suspension of the traction members can allow resonance oscillation motion in the desired plane as a result of appropriate suspension points and traction member lengths. On the other hand, the damping effect of such traction member suspension is negligible in practical operation, which allows durable suspension and at the same time a low amount of energy input to achieve oscillation.

The membrane filtration device according to the present invention may be further developed by provide one or more damping members which are arranged on the underside of the frame for disposing the membrane filtration device on a bottom surface. Damping members should be understood in this context to be members which do not exhibit purely elastic properties, but rather viscoelastic behavior at the least, i.e., which specifically have a stiffness which is dependent on the speed of deformation. This configuration makes it possible, in particular, to dispose the inventive membrane filtration device on a bottom surface, without the oscillations of the membrane package causing interference with adjacently installed devices.

It is still further preferred that the oscillation device includes a motor which drives a motor shaft on which an eccentric weight is disposed, and that the motor is preferably connected to the frame by a connection having a spring constant that is at least one and preferably several orders of magnitude stiffer than the spring constant of the at least one spring and/or of the sum total of springs between the frame and the membrane package. With such a configuration, oscillation is stimulated in a robust manner that is also cost-efficient in terms of construction and production engineering. The motor and its eccentric weight is connected substantially rigidly to the frame. It should be understood in this regard that the stiffness of the rigid connection between the motor and the frame must be considered in relation to the stiffness of the connection between the membrane package and the frame. In this relationship, it is preferred if the error constant is one order of magnitude, and more particularly several orders of magnitude stiffer, in the connection between the frame and the oscillation device that in the connection between the frame and the membrane package. It should be understood as a basic principle that this stiffness ratio, and the relationship thus established as a definition of a rigid or stiff connection, can be applied to any kind of coupling of an oscillation device to the frame.

According to another preferred embodiment, the at least one spring and/or preferably all the springs between the frame and the membrane package are biased to exert pressure. Developing the present invention in this way prevents the springs, even if there is relative movement between the membrane package and the frame due to the induced oscillation, from being deflected from a pressure load into a tensile load and from passing through a neutral point in the form of their nominal length, which would cause oscillation behavior that is disorderly on the whole. In addition, biasing the springs tends to produce a higher resonance frequency, since the forces acting between the frame and the membrane package are stronger on the whole.

It is further preferred that the oscillation device includes a motor which drives a motor shaft on which an eccentric weight is disposed, the eccentricity of which is adjustable in order to set the oscillation amplitude of the membrane package. Adjusting the eccentricity of an eccentric weight, i.e., adjusting different radial distances of the center of mass of the weight from the axis of rotation, is an efficient way of setting the oscillation amplitude and thus the strength of the shear force between the medium to be cleaned and the membrane surfaces of the membrane package. In particular, the eccentricity can also be set for the purpose of setting higher or lower motor speeds. It should be understood in this regard that the total load-bearing capacity of the device permits an increase in eccentricity, with a simultaneous increase or maintenance of a motor speed, only as far as given limits. In order not to exceed the fatigue limit of the filtration device, a Wohler curve can be used to specify a maximum speed for each eccentricity, depending on the design and dimensioning of the components. Within this scope of adjustment, the eccentricity of the weight, and where relevant the speed as well, can be changed to reach a specific resonance frequency and oscillation amplitude.

The embodiments with a motor having a shaft with eccentric weight can be further developed by having the shaft extend perpendicular to the plane of the membrane filter elements. In this configuration, the oscillatory forces produced by the motion of the eccentric weight about the shaft axis are directly oriented in such a way that they act in a plane parallel to the membrane filter elements, as a result of which oscillation in the desired direction can be directly effected in a particularly effective manner.

The membrane filtration device according to the present invention may be further developed, finally, such that the weight force of the membrane package is transferred to one or more points on the frame which lie above the center of mass of the membrane filter element in the direction of gravity. By means of this embodiment, the weight of the membrane package is transferred to the frame in a constructionally advantageous manner, such that no damping effects counteract the desired oscillatory motion of the membrane package, while at the same time permitting simple production and assembly of the inventive membrane filtration device.

Finally, it is still further preferred that the oscillation device be fixed to one side of the frame and that a counterweight whose mass is preferably equal to the mass of the oscillation device is rigidly fixed to the frame on the opposite side. By fixing the oscillation device to one side of the frame and rigidly fixing a counterweight with a mass preferably equal to that of the oscillation device to the opposite side of the frame, the oscillation behavior of the frame and hence the generation of the resonance vibration of the membrane package is optimized in an effective manner, while simultaneously preventing any damage being caused to the frame by constant oscillation. In this regard, the counterweight can preferably be rigidly connected by welding it or bolting it to the frame. Both the oscillation device and the counterweight can preferably be made adjustable in height, so as to be able to adjust the oscillatory effect of the oscillation device and the effect of the counterweight mass to the load state of the membrane package, its arrangement within the frame and the oscillation behavior of the frame.

Another aspect of the present invention concerns using a membrane filtration device of the type described in the foregoing for membrane filtration of biologically contaminated wastewater resulting from the keeping of livestock. This aspect of the present invention is based on the realization that the membrane filtration devices mainly used hitherto on a laboratory scale are also suitable, if appropriately configured and adjusted, for industrial cleaning purposes in agriculture and in particular for cleaning biologically contaminated wastewater.

According to yet another aspect of the present invention, a method for cleaning biologically contaminated wastewater from agricultural livestock husbandry is proposed, the method comprising the steps of
feeding the wastewater to one or a plurality of inlet chambers disposed upstream from a plurality of membrane filter elements;
filtering the wastewater by means of the membrane filter elements; and
discharging the filtered wastewater from an outlet chamber or chambers disposed downstream from the membrane filter elements,
wherein the membrane filter elements are made to oscillate such that the direction of oscillation is parallel to the plane of the membrane filter elements. The method according to the present invention is based on the realization that biologically contaminated wastewater from agricultural livestock husbandry can be filtered very efficiently using a plurality of membrane filter elements, if the membrane filter elements are made to oscillate in a particularly effective and efficient manner so that strong shear forces are produced between the membrane filter elements and the wastewater to be cleaned. It should be understood in this regard that the oscillations can basically be transferred to the membrane filter elements in any constructional manner, in particular by direct stimulation from an oscillation source connected rigidly to the membrane filter elements.

However, it is particularly preferred that the membrane filter elements are made to oscillate by means of an oscillation device, preferably a rotating unbalance, which is connected stiffly to a frame enclosing the membrane filter elements, and the oscillation is transferred from the frame to the membrane filter elements by springs which are preferably biased to exert pressure. This development of the present invention stimulates the oscillations for the inventive method in a manner that is particularly efficient and economical for the stated purpose, and which also allows highly contaminated wastewater containing a high proportion of solid particles to be filtered.

Finally, it is particularly preferred that the resonance frequency of the oscillation system formed by springs and the membrane filter elements may be set by adjusting the bias, the spring constants, the effective quantity and/or the effective length of the springs between the frame and the membrane package. With this development, the present invention achieves, by coordinating the design parameters relevant for oscillation, a resonance frequency of the vibration system comprising the membrane package and the springs which support the membrane package within the frame in the direction of oscillation. In this way, a very strong oscillation effect can be obtained with a maximum reduction in the energy input required.

BRIEF DESCRIPTION OF THE DRAWINGS

Preferred embodiments of the membrane filtration device according to the present invention shall now be described with reference to the attached drawings, in which.

DETAILED DESCRIPTION OF THE PREFERRED EMBODIMENTS

Figure 1:
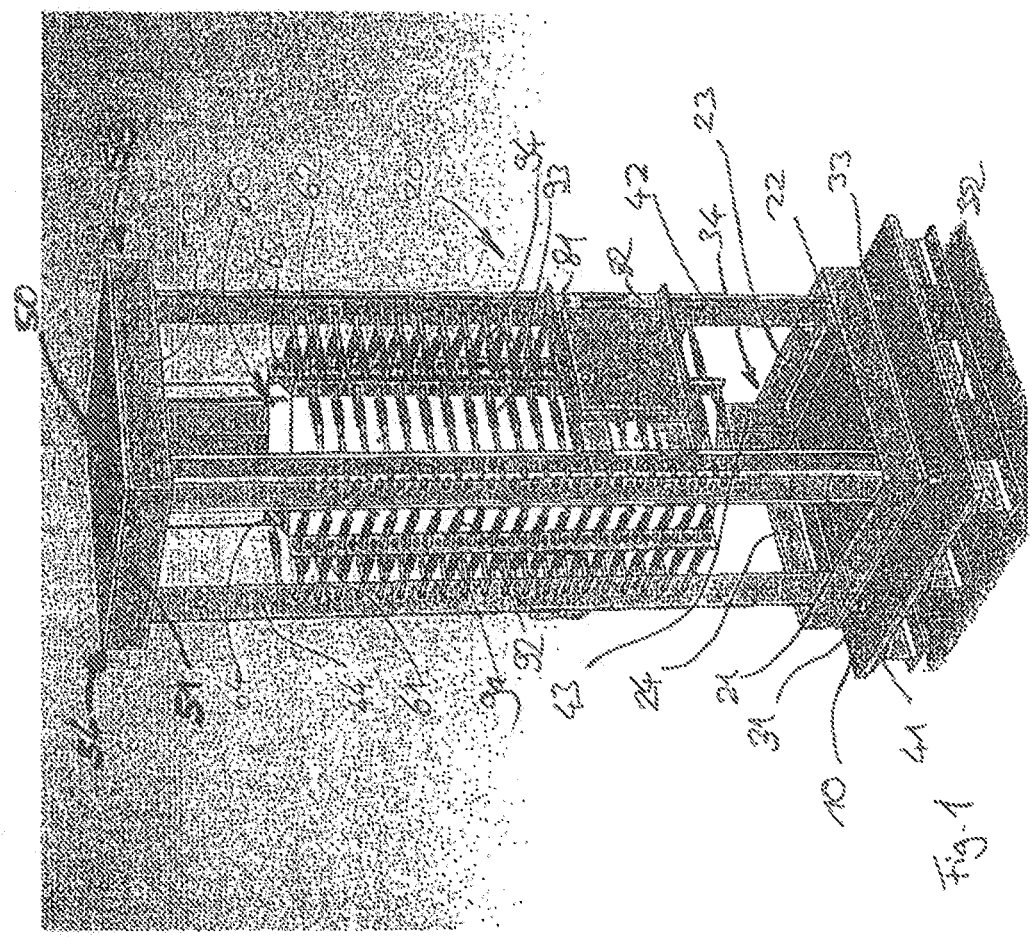
FIG. 1 shows a perspective view of a first embodiment of a membrane filtration device according to the present invention, as seen at an angle from above and behind.
Figure 4:
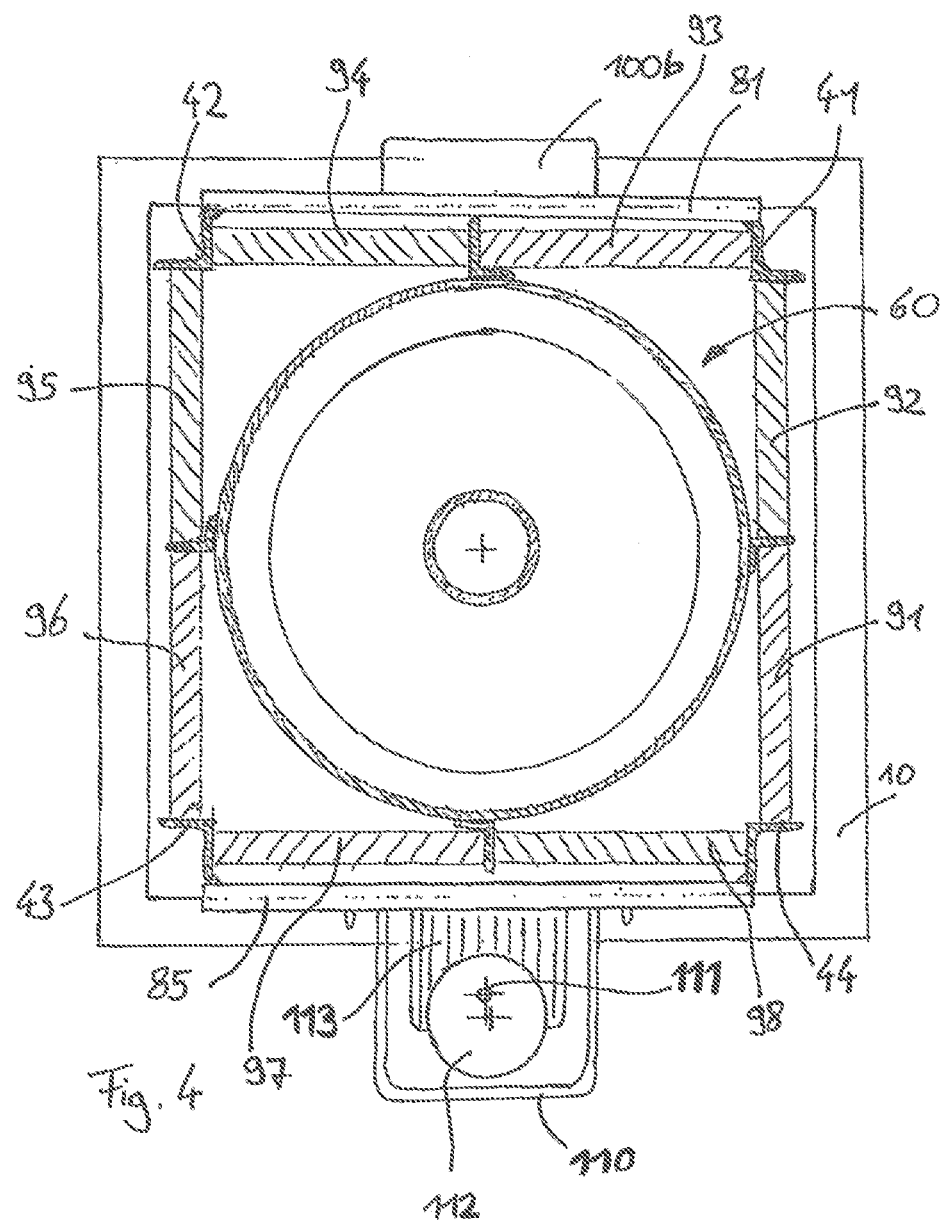
FIG. 4 shows a schematic plan view, partially cut away horizontally, of a membrane filtration device according to the present invention as shown in FIG. 2.

For purposes of description herein, the terms "upper," "lower," "right," "left," "rear," "front," "vertical," "horizontal," and derivatives thereof shall relate to the invention as orientated in FIGS. 1 and 4. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to the Figures, the two embodiments differ merely in the manner in which a counterweight 100a, 100b and a motor housing 110 are fixed to a frame 20 and shall now be described together in respect of their common features. The inventive membrane filtration device is disposed on a base plate 10 which is held at a distance above a floor by means of several double-T profiles and which can be fixedly anchored to the floor by bolting the double-T profiles to said floor.

A cubical frame 20 is fixed by means of oscillation members 31-34 to the top side of base plate 10. On its underside, cubical frame 20 has four profiles, which are preferably in the form of L-profiles 21-24, which are welded together to form a rectangle and in particular a square. Oscillation members 31-34 are each inserted on the underside of the square formed by L-profiles 21-24 into the respective corners, as rubbery elastic elements 31-34 between base plate 10 and the L-profile elements, and are fastened at both ends thereto.

From each corner of the square formed by L-profiles 21-24, a frame profile 41-44 extends in the vertical direction as far as a top cover plate 50, which for its part is welded to four profiles 51-54 forming a square. The upper ends of frame profiles 41-44 are welded to profiles 51-55 at the corners of said square.

A membrane package 60 is disposed inside the frame 20 formed by the L-profiles and frame profiles 41-44 that are joined together at the bottom and top to form squares. Membrane package 60 comprises a plurality of membrane support plates of identical construction which are stacked one on top of the other and pressed onto each other by a clamping force exerted in a vertical direction. As a result, the membrane support frames form a wall of the membrane package that encloses the membrane package on all sides. A lower base plate and an upper cover plate close the membrane package at the top and bottom. Inside each membrane support frame, two membrane filter elements are disposed which lie parallel to and spaced apart from each other and which enclose an inlet chamber between them. An outlet chamber is disposed between the respective upper membrane filter element of a membrane holding frame and the respective lower membrane filter element of an adjacent membrane holding frame. All the membrane filter elements in the membrane package are disposed parallel to and spaced apart from one another and are oriented in such a way that the direction of extension of frame profiles 41-44 is perpendicular to the plane of the membrane filter elements. The membrane package thus forms a plurality of inlet chambers which are in direct fluid communication with each other and which are connected to an inlet opening formed on the membrane package. Inside the membrane package, there is also a plurality of outlet chambers, which for their part are in direct fluidic communication with each other and which are connected to an outlet opening formed on the membrane package. The inlet and outlet chambers are connected indirectly to each other via the membrane filter elements, so fluid can flow from the inlet chamber into the outlet chamber by passing through a membrane filter element. The design of the membrane filter elements and of the membrane package formed by them may be the same, in particular, as the designs described in U.S. Pat. No. 4,952,317 or U.S. Pat. No. 6,322,698; these documents are fully incorporated by reference in the present disclosure.

Membrane package 60 is disposed in a membrane housing which has the form of a cylindrical tube, extends along a vertical axis of symmetry and which consequently has a round cross section in a horizontal plane. At the outer periphery of the membrane housing, vertically extending lateral strips 61-64 are disposed, which are distributed with an angular spacing of 90° from each other around the periphery of the membrane housing and which extend over the entire length of the tube. It should be understood, as a basic principle, that the inner cross section of the membrane housing in which the membrane package is disposed should be the same as the membrane contour, and, therefore, if the membrane contour is rectangular, it can also be a rectangular cross section. The membrane housing is closed at its top side and underside by a rectangular plate, and in particular by a square plate, as shown. The membrane housing extends in the vertical direction, so membrane package 60 has a smaller length than frame profiles 41-44. Membrane package 60 is pivoted about its vertical axis by 45° relative to the position of lateral strips 61-64 toward the frame and disposed inside the frame in such a way that lateral strips 61-64 of membrane package 60 come to rest exactly in the middle between two respective frame profiles 41-44. As can be seen from FIG. 2, frame profiles 41-44 and a mental cross section formed by connecting the lateral strips thus form, in horizontal cross section, a square with a rhombus disposed therein.

Each lateral strip 61-64 has an outwardly projecting bar which is at an angle of 90° to the external surfaces of the membrane package, i.e., which lies in a radial plane.

Lateral strips 61-64 of the membrane housing are provided with a plurality of bore holes, into each of which a respective guide bolt extending parallel to the membrane filter elements in the horizontal direction is securely inserted and fastened.

In the embodiment shown, each frame profile 41-44 is in the form of an L-profile and likewise has a plurality of through bores in each limb of the "L". The quantity of bore holes in each limb of the "L" is equal to half the quantity of bore holes formed in the membrane package strips, and the distance between the bore holes in the L-profile is double the distance between the bore holes in the membrane package strips. The bore holes in frame profiles 41-44 are designed in such a way that each bore hole in frame profiles 41-44 lies exactly opposite one bore hole in a membrane package strip, and never opposite the same through bore hole.

In each through bore in frame profiles 41-44, a guide bolt is inserted and fastened which is oriented coaxially with regard to the respective guide bolt in the opposite through bore of the membrane package strip.

The guide bolts are used to receive and guide coil springs 91-98. Between two coaxial guide bolts mutually facing each other, a helical compression spring is inserted in a biased state between the membrane package strip and the frame profile. A plurality of helical compression springs extend in this manner between each membrane package strip and each frame profile, so the membrane package strips are supported in both horizontal directions by the frame profiles between which they are respectively disposed.

As a result of this arrangement, membrane package 60 is fixed inside the frame by a total of eight sets of helical compression springs. Of these eight sets, four sets are oriented parallel to each other, and the other four sets are perpendicular to said first four sets and likewise oriented parallel to each other. The sets of helical compression springs are each arranged in one plane of a fictitious side wall that would be formed between two adjacent frame profiles 41-44.

Membrane package 60 is suspended by means of four steel cables 71-74, which are fastened to the top four corners of the membrane package, from the upper profiles 51-54 of the frame. The four steel cables 71-74 bear the entire weight force of the membrane package, so the coil springs biased to exert pressure to not have to bear any vertical loads.

An upper and a lower cross-member 85, 86 are welded to frame profiles 43, 44. Two longitudinal profiles 87, 88 extending in the vertical direction are inserted between the two inserted cross-members 85, 86 and rigidly welded to cross-members 85, 86.

An electric motor 113 is disposed inside a motor housing 110. Motor housing 110 and electric motor 113 are connected to the two longitudinal profiles 87, 88, in that the motor housing 110 is directly and rigidly fastened by four fasteners in four corresponding bore holes in the longitudinal profiles. The electric motor 113 is connected in this way directly and rigidly to the frame 26 formed by frame profiles 41-44 and is oriented in such a way that its output shaft rotates about a vertical axis 111. Axis 111 stands perpendicular to the membrane filter elements. An eccentric weight 112 produces an unbalance when the electric motor turns and is eccentrically fixed to the output shaft. The electric motor 113 and the eccentric weight 112 on its output shaft are completely encapsulated by means of the motor housing 110 in which the output shaft may also be appropriately mounted in order to absorb the forces resulting from rotation of the eccentric weight 112.

A plurality of bore holes are arranged vertical spaced apart from each other in longitudinal profiles 87, 88, such that the arrangement of motor housing 110 and of the motor 113 disposed therein can be vertically adjusted at several discrete intervals along the longitudinal profiles. In this way, the location at which the oscillation effect is inputted can be vertically adjusted in discrete intervals, in that the motor housing 110 can be fastened at a plurality of vertically spaced apart positions along longitudinal profiles 87, 88. Inside motor housing 110, the electric motor 113 is disposed underneath the eccentric weight 112. This allows the eccentric weight to be disposed in such a way that it rotates in a plane in which the center of mass of the membrane package and of the membrane housing surrounding it also lie. This results in very efficient oscillation of the membrane package, that is, oscillation that can be produced with little energy input and which producing an efficient shear motion on all the membrane surfaces inside the membrane package.

On the side opposite frame profiles 43, 44, an upper and a lower cross-member 81, 82 are rigidly connected in the same manner to frame profiles 41, 42 by welding.

In the first embodiment according to FIG. 1, a plate-shaped counterweight 100a is fastened directly and rigidly to said cross-members 81, 82.

Figure 2:
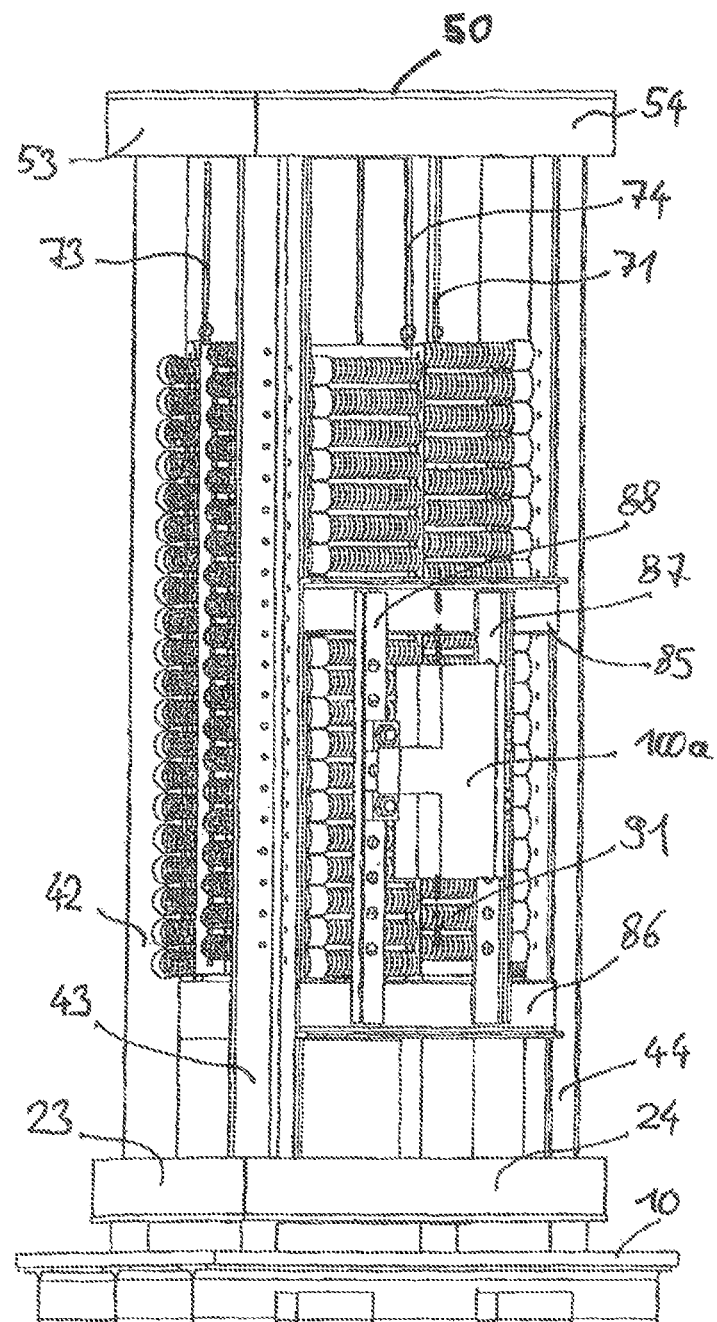
FIG. 2 shows a perspective view of a second embodiment of a membrane filtration device according to the present invention, seen at an angle from the front.
Figure 3:
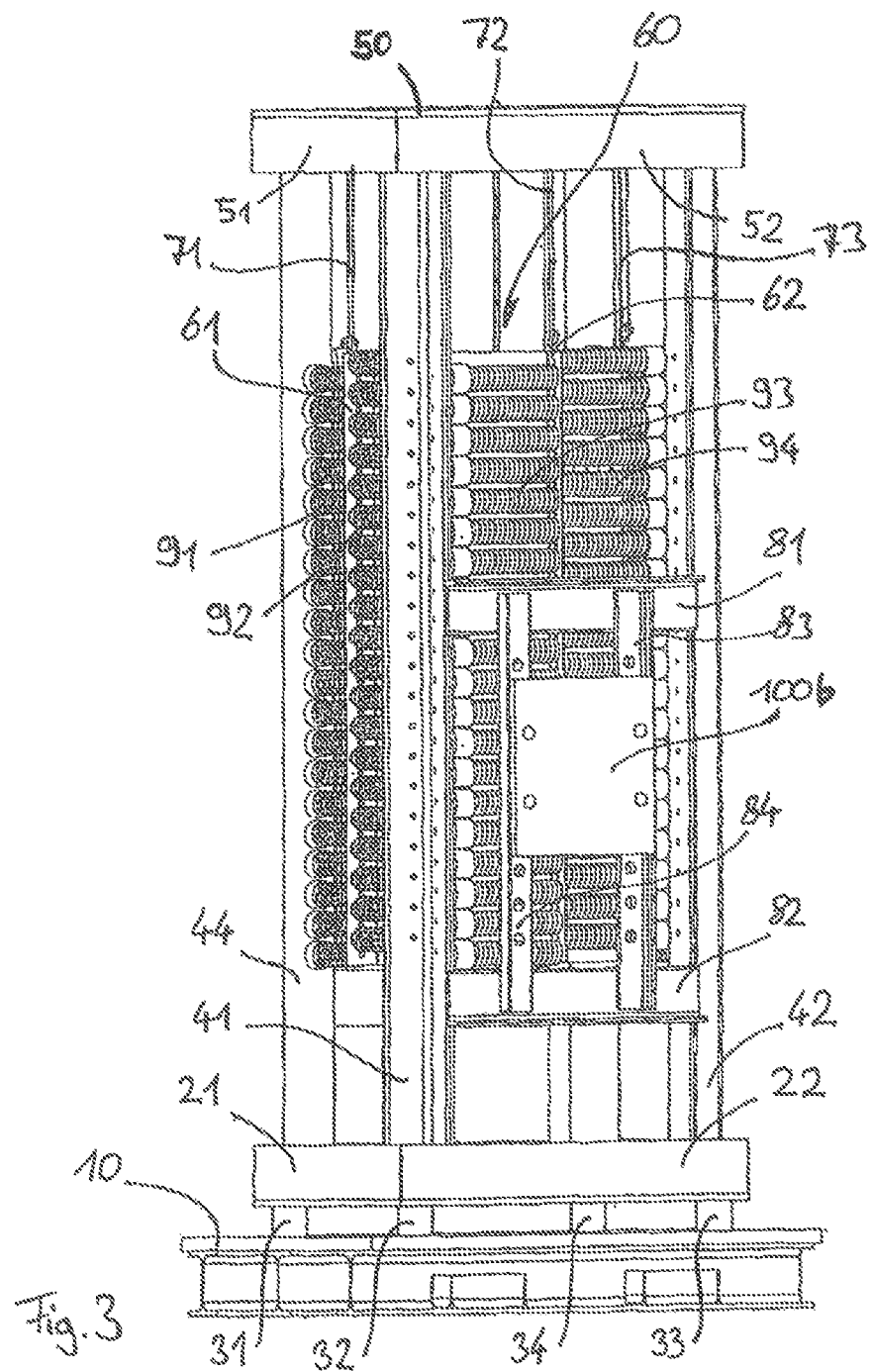
FIG. 3 shows a perspective view of the membrane filtration device according to the present invention as shown in FIG. 2, as seen at an angle from behind.

In the second embodiment according to FIGS. 2-4, two longitudinal profiles 87, 88 extending in the vertical direction are inserted between the two inserted profiles 81, 82 and rigidly welded to cross-members 85, 86. In this embodiment, a counterweight 100b can be mounted, like the electric motor 113 on the other side, at different adjustable heights by means of a plurality of bore holes in longitudinal supports 83, 84, and can therefore be adjusted to the position of the eccentric weight 112.

The mass of counterweight 100a, 100b equals the added mass of the electric motor 113, the eccentric weight 112 and the horizontal L-profiles 83, 84. This counterweight 100a, 100b is used to balance the oscillation behavior of the frame, produced by the rotating eccentric weight 112, in such a way that the membrane package 60 can be made to oscillate with a resonance frequency inside the oscillating suspension.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A membrane filtration device, comprising:
    a plurality of planar membrane filter elements combining to form a membrane package, the plurality of planar membrane filter elements rigidly fixed to a wall of the membrane package, the wall enclosing the membrane package on all sides, wherein the plurality of planar membrane filter elements are disposed within the membrane package parallel to and spaced apart from one another and each planar membrane filter element being oriented in a horizontal plane;
    at least one inlet chamber within the wall connected to at least one inlet opening for feeding a fluid to be filtered upstream from the membrane filter elements, and at least one outlet chamber connected to at least one outlet opening for discharging a filtered fluid portion produced by filtration downstream from the membrane filter elements;
    a frame surrounding the membrane package and connected to the wall of the membrane package by a plurality of springs whose main direction of spring action extends parallel to the plane of the membrane filter, the frame comprising an open structure which is not fluid tight;
    an oscillation unit directly connected to the frame only and indirectly connected to the wall through the plurality of springs to oscillate the membrane package and the wall in a direction parallel to the planar membrane filter elements; and the plurality of springs extending parallel to the plane of the membrane filter elements, the plurality of springs being connected at a first end to the wall of the membrane package and at a second end to the frame, the plurality of springs being subdivided into at least a first set and a second set of springs, such that all the springs within each set of springs extend parallel to each other and that the direction of the springs in the first set of springs extend at an angle to the direction of the springs of the second set.

2. The membrane filtration device of claim 1, wherein the first set of springs is perpendicular to the second set of springs.

3. The membrane filtration device of claim 1, wherein the spring constants, the length of the springs, and the oscillation unit are adapted to the mass of the membrane package such that the oscillation unit actuates the membrane package.

4. The membrane filtration device of claim 3, wherein the at least one spring has a bias, a spring constant, and an effective length, and wherein any one or more of the bias, spring constant, or effective length of the at least one spring between the frame and the membrane package can be adjusted in order to set the frequency formed by the at least one spring and the membrane package.

5. The membrane filtration device of claim 1, wherein the membrane package is suspended inside the frame by means of traction members which transfer the weight force of the membrane package to the frame.

6. The membrane filtration device of claim 5, wherein the traction members are wire cables.

7. The membrane filtration device of claim 1, further comprising one or more damping members arranged on an underside of the frame for disposing the membrane filtration device on a bottom surface.

8. The membrane filtration device of claim 1, wherein the oscillation unit includes a motor, a motor shaft, and an eccentric weight disposed on the motor shaft, wherein the motor is connected to the frame by a connection having a spring constant that is at least one order of magnitude stiffer than the spring constant of the at least one spring between the frame and the membrane package.

9. The membrane filtration device of claim 8, wherein the spring constant of the connection of the motor to the frame is several orders of magnitude stiffer than the spring constant of the at least one spring between the frame and the membrane package.

10. The membrane filtration device of claim 1, wherein the at least one spring is biased to exert pressure.

11. The membrane filtration device of claim 10, wherein all the springs between the frame and the membrane package are biased to exert pressure.

12. The membrane filtration device of claim 1, wherein the oscillation unit includes a motor, a motor shaft, and an eccentric weight disposed on the motor shaft, wherein the eccentricity of the oscillation device is adjustable to set the oscillation amplitude of the membrane package.

13. The membrane filtration device of claim 8, wherein the motor shaft extends perpendicularly to the plane of the membrane filter elements.

14. The membrane filtration device of claim 1, wherein the oscillation unit includes a weight rotatable about and disposed eccentric to an axis, and wherein the membrane package has a center of mass that lies in the plane in which the weight rotates, the plane being adjustable relative to the membrane package by means of an infinitely variable or discretely adjustable connection between the eccentric weight and the frame.

15. The membrane filtration device of claim 1, wherein the membrane package has a center of mass and the weight force of the membrane package is transferred to one or more points on the frame which lie above the center of mass of the membrane filter element in the direction of gravity.

16. The membrane filtration device of claim 1, wherein the oscillation unit is fixed to one side of the frame and a counterweight is rigidly fixed to the frame on the opposite side.

17. The membrane filtration device of claim 16, wherein the mass of the counterweight is equal to the mass of the oscillation device.

\* \* \* \* \*